US011669639B2

(12) United States Patent
Iyer et al.

(10) Patent No.: US 11,669,639 B2
(45) Date of Patent: Jun. 6, 2023

(54) SYSTEM AND METHOD FOR MULTI-USER STATE CHANGE

(71) Applicant: Dell Products L.P., Round Rock, TX (US)

(72) Inventors: Vivek Viswanathan Iyer, Austin, TX (US); Daniel Lawrence Hamlin, Round Rock, TX (US); Yung-Sheng Lin, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 17/185,222

(22) Filed: Feb. 25, 2021

(65) Prior Publication Data

US 2022/0269802 A1    Aug. 25, 2022

(51) Int. Cl.
*G06F 21/62* (2013.01)
*G06F 21/32* (2013.01)
*G06F 21/84* (2013.01)

(52) U.S. Cl.
CPC ............ *G06F 21/629* (2013.01); *G06F 21/32* (2013.01); *G06F 21/84* (2013.01)

(58) Field of Classification Search
CPC ........ G06F 21/629; G06F 21/32; G06F 21/84; G06F 21/6245
See application file for complete search history.

(56) References Cited

U.S. PATENT DOCUMENTS

| 6,233,341 | B1* | 5/2001 | Riggins | H04L 63/0823 713/175 |
| 6,578,081 | B1* | 6/2003 | Tominaga | G06F 21/6245 707/999.009 |
| 8,171,283 | B2* | 5/2012 | Pietrowicz | H04L 9/3268 713/156 |
| 9,519,769 | B2* | 12/2016 | Azar | G06F 21/36 |
| 9,870,071 | B2* | 1/2018 | Park | G06F 21/36 |
| 10,289,835 | B1* | 5/2019 | Machani | H04L 9/0894 |
| 10,317,764 | B2* | 6/2019 | Hyun | G02F 1/133504 |
| 10,411,897 | B2* | 9/2019 | Paolini-Subramanya | H04L 63/123 |
| 11,240,438 | B1* | 2/2022 | Justin | H04N 23/63 |
| 11,334,653 | B2* | 5/2022 | Leuthardt | G06F 21/32 |
| 11,361,060 | B1* | 6/2022 | Lyman | H04L 12/2829 |
| 11,394,555 | B2* | 7/2022 | Li | G06F 21/602 |
| 11,523,049 | B1* | 12/2022 | Periyakulam Tharakraj | H04N 5/265 |
| 2003/0097592 | A1* | 5/2003 | Adusumilli | H04L 63/0823 713/168 |
| 2006/0221067 | A1* | 10/2006 | Kim | G09G 5/00 345/204 |
| 2007/0277248 | A1* | 11/2007 | Agrawal | G06F 8/60 726/30 |

(Continued)

*Primary Examiner* — Gary S Gracia
(74) *Attorney, Agent, or Firm* — McDermott Will & Emery LLP

(57) ABSTRACT

A system for configuring an information handling system based on a multi-user state change. An intelligent sensor hub communicates with sensors to detect the number of persons in a field of view of the information handling system. When the intelligent sensor hub determines there is a change in the number of persons, the information is sent out-of-band to an embedded controller (EC) independent of a host operating system. The EC makes a change to the configuration of the information handling system if needed.

20 Claims, 3 Drawing Sheets

(56) References Cited

U.S. PATENT DOCUMENTS

| | | | |
|---|---|---|---|
| 2009/0228703 A1* | 9/2009 | Grajek | H04L 63/0823 713/156 |
| 2010/0031025 A1* | 2/2010 | Zhang | H04L 63/0823 713/156 |
| 2010/0031030 A1* | 2/2010 | Kao | H04W 12/069 713/156 |
| 2011/0214178 A1* | 9/2011 | van den Berg | H04W 12/122 726/22 |
| 2012/0200391 A1* | 8/2012 | Sugiyama | G06F 21/32 340/5.82 |
| 2012/0327172 A1* | 12/2012 | El-Saban | G06T 7/174 348/14.02 |
| 2013/0155055 A1* | 6/2013 | Doi | H04N 13/376 345/419 |
| 2013/0222609 A1* | 8/2013 | Soffer | G06F 21/81 348/207.1 |
| 2014/0368604 A1* | 12/2014 | Lalonde | G06V 40/16 348/14.08 |
| 2015/0113657 A1* | 4/2015 | Moore | G06F 21/84 726/26 |
| 2016/0344725 A1* | 11/2016 | Severin | H04L 63/062 |
| 2016/0350579 A1* | 12/2016 | Lin | G06V 40/1335 |
| 2017/0243485 A1* | 8/2017 | Rubin | H04W 4/46 |
| 2017/0317837 A1* | 11/2017 | Alrawais | H04L 9/321 |
| 2017/0332044 A1* | 11/2017 | Marlow | G06V 20/46 |
| 2017/0359365 A1* | 12/2017 | van den Berg | H04W 4/20 |
| 2018/0129829 A1* | 5/2018 | Li | G02B 7/006 |
| 2018/0173867 A1* | 6/2018 | De | G06F 21/32 |
| 2018/0240339 A1* | 8/2018 | Moisio | H04W 12/10 |
| 2018/0260581 A1* | 9/2018 | Adams | G06F 21/84 |
| 2018/0270048 A1* | 9/2018 | Bar-El | G06F 21/6281 |
| 2018/0276418 A1* | 9/2018 | Li | G06F 21/6245 |
| 2019/0138737 A1* | 5/2019 | Leipold | G06F 21/84 |
| 2019/0172238 A1* | 6/2019 | Miao | G06V 30/194 |
| 2019/0363398 A1* | 11/2019 | Greenberger | G06F 3/04883 |
| 2020/0097758 A1* | 3/2020 | Basso | G06K 9/6267 |
| 2020/0220737 A1* | 7/2020 | Ryu | B60R 11/00 |
| 2020/0285722 A1* | 9/2020 | He | G06F 21/32 |
| 2021/0049883 A1* | 2/2021 | Nassi | G08B 13/1965 |
| 2021/0067699 A1* | 3/2021 | Huang | H04N 1/2112 |
| 2021/0081003 A1* | 3/2021 | Bristol | H04N 23/57 |
| 2021/0174479 A1* | 6/2021 | Li | G06T 5/50 |
| 2022/0029835 A1* | 1/2022 | Fourquin | H04L 9/3278 |
| 2022/0269802 A1* | 8/2022 | Iyer | G06F 21/84 |
| 2022/0277091 A1* | 9/2022 | Moharana | G06V 20/35 |
| 2022/0309170 A1* | 9/2022 | Iyer | G06F 21/604 |
| 2023/0025191 A1* | 1/2023 | Pareek | G06F 21/6245 |

\* cited by examiner

SYSTEM AND METHOD FOR MULTI-USER STATE CHANGE

BACKGROUND

Field of the Disclosure

The disclosure relates generally to maintaining secure protocols for an information handling system, and in particular, for setting and adjusting a privacy mode for an information handling system based on a number of users detected relative to the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems may have input/output (I/O) devices for audio input (microphone), video input (camera), audio output (speakers) and video output (privacy screen).

SUMMARY

Embodiments disclosed herein may be generally directed to a system and method for changing a privacy mode of an information handling system based on a change in the number of persons in a field of view of the information handling system.

An information handling system may include an embedded controller (EC) for configuring the information handling system according to a first privacy policy. An intelligent sensor hub may be communicatively coupled to the embedded controller and a set of sensors comprising a face detection sensor and a Time of Flight (ToF) sensor. The intelligent sensor hub is configured to receive information from the plurality of sensors, determine a number of persons in a field of view of the information handling system, determine a change in the number of persons; and communicate the change in the number of persons to the embedded controller. Communication between the intelligent sensor hub and the embedded controller may be performed out-of-band (independent of the status of other in-band components that operate after the operating system has booted). The embedded controller comprises a privacy manager service configured to receive the information from the intelligent sensor hub, determine a second privacy policy based on the change in the number of persons and configure the information handling system based on the second privacy policy.

In some embodiments, the set of sensors comprises a hinge sensor, the intelligent sensor hub is configured to determine the number of persons in the field based on information received from the face detection sensor, the ToF sensor and the hinge sensor and the second privacy policy causes the EC to configure the information handling system based on the number of persons in the field of view and a configuration of a hinge of the information handling system.

In some embodiments, the set of sensors comprises an ambient light sensor, the intelligent sensor hub is configured to determine the number of persons in the field based on information received from the face detection sensor, the ToF sensor and the ambient light sensor and the second privacy policy causes the EC to configure the information handling system based on the number of persons in the field of view and the ambient light conditions.

In some embodiments, the set of sensors comprises a single device orientation (SDO) sensor, the intelligent sensor hub is configured to determine the number of persons in the field based on information received from the face detection sensor, the ToF sensor and the SDO sensor and the second privacy policy causes the EC to configure the information handling system based on the number of persons in the field of view and an orientation of the information handling system.

In some embodiments, the set of sensors comprises an ambient noise sensor, the intelligent sensor hub is configured to determine the number of persons in the field based on information received from the face detection sensor, the ToF sensor and the ambient noise sensor and the second privacy policy causes the EC to configure the information handling system based on the number of persons in the field of view and ambient noise.

In some embodiments, the privacy manager service is coupled to one or more of a visual privacy block of instructions executable to configure the information handling system to limit the display of information on a display, a privacy screen block of instructions executable to initiate a privacy screen to limit the field of view and an audio privacy block of instructions executable to configure the information handling system to limit the output of audio information by a speaker.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 1:
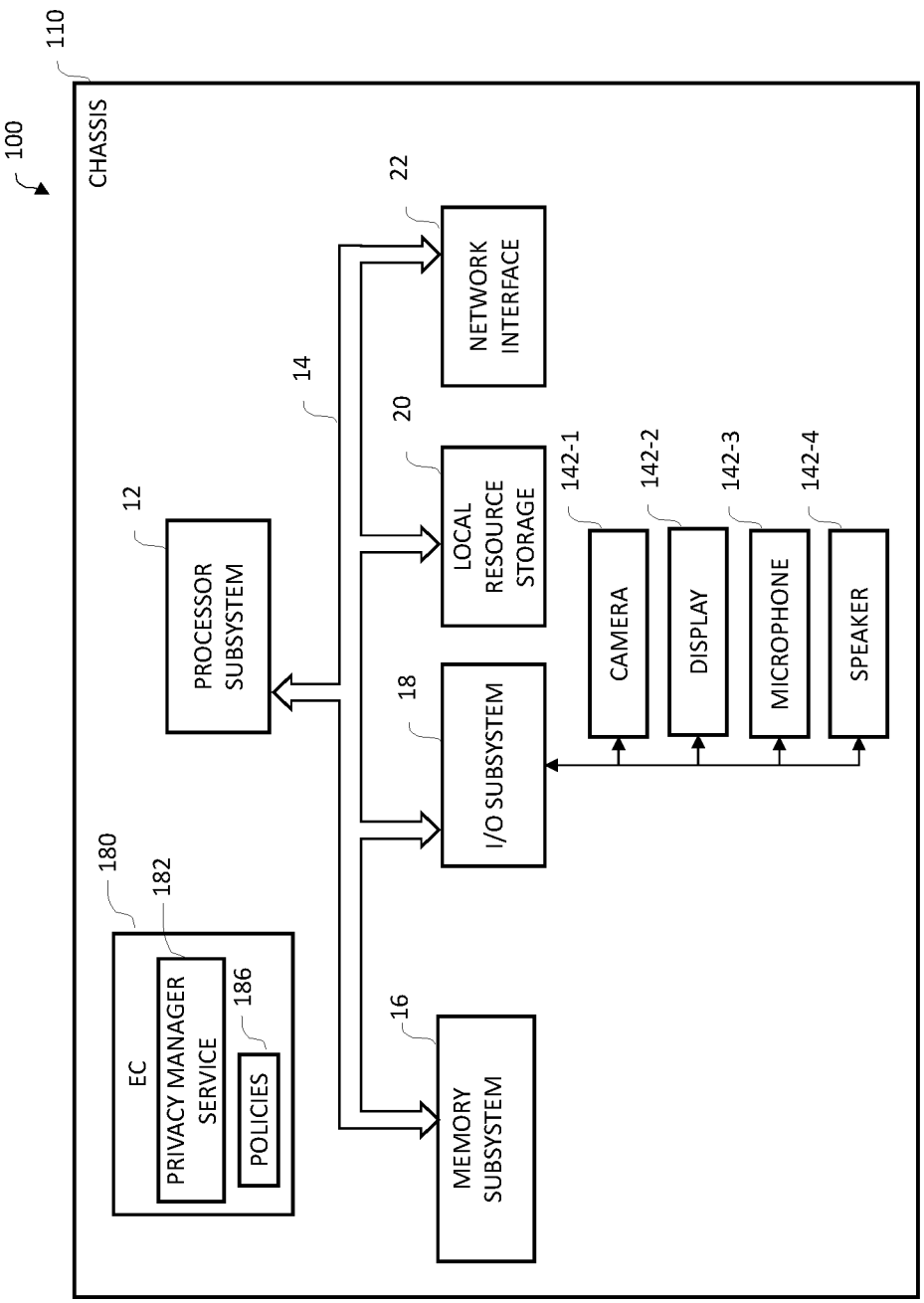
FIG. 1 is a block diagram of selected elements of an embodiment of an information handling system.
Figure 2:
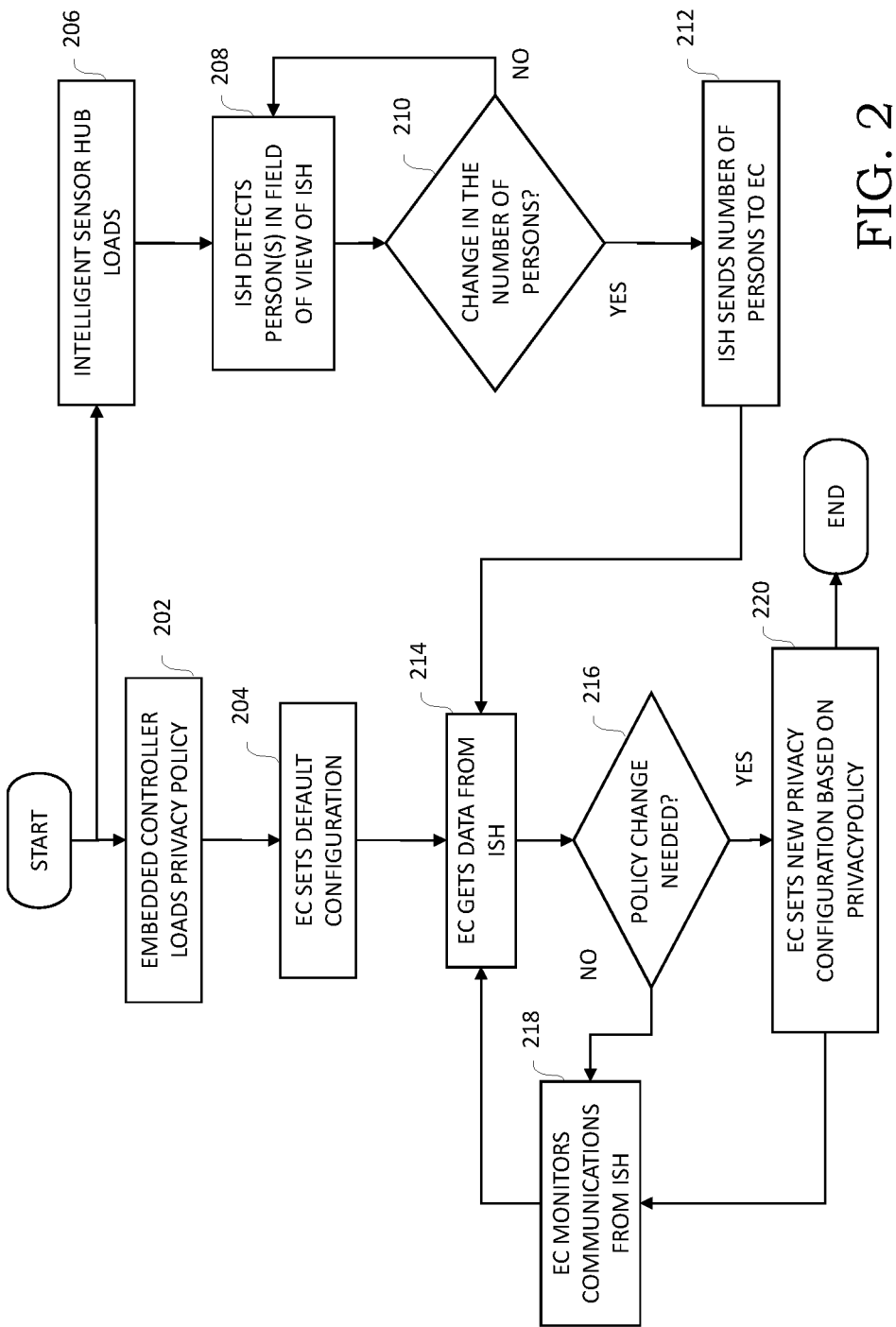
FIG. 2 illustrates a flow diagram of a method for adjusting a privacy mode in an information handling system based on the number of people detected in a field of view of the information handling system.
Figure 3:
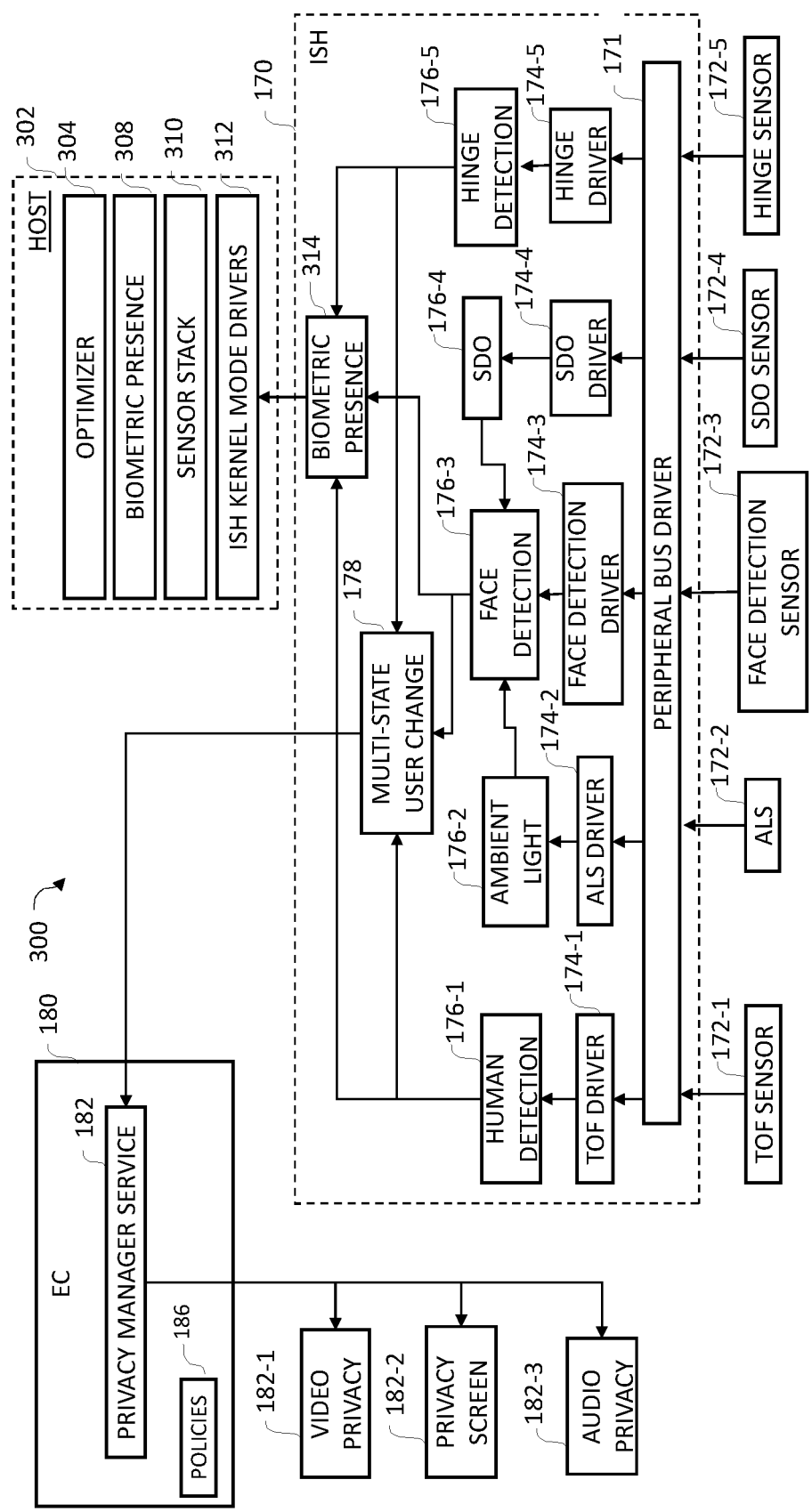
FIG. 3 illustrates a system architecture diagram for adjusting a privacy mode in an information handling system based on the number of people detected in a field of view of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 12, which may comprise one or more processors, and system bus 14 that communicatively couples various system components to processor subsystem 12 including, for example, a memory subsystem 16, an I/O subsystem 18, a local storage resource 20, and a network interface 22. System bus 14 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 12 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 12 may interpret and/or execute program instructions and/or process data stored locally (e.g., in memory subsystem 16 and/or another component of information handling system). In the same or alternative embodiments, processor subsystem 12 may interpret and/or execute program instructions and/or process data stored remotely.

Also in FIG. 1, memory subsystem 16 may comprise a system, device, or apparatus operable to retain and/or retrieve program instructions and/or data for a period of time (e.g., computer-readable media). Memory subsystem 16 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Memory subsystem 16 may store applications executable by processor subsystem 12. An application may process information, such as a word processing application or spreadsheet application. An application may be associated with an I/O device 142, such as a teleconferencing application. IHS 100 may execute multiple applications in parallel, wherein a user may use a first application to conduct a teleconference and use a second application containing spreadsheets with data.

In information handling system 100, I/O subsystem 18 may comprise a system, device, or apparatus generally operable to receive and/or transmit data to/from/within information handling system 100. I/O subsystem 18 may represent, for example, a variety of communication interfaces, graphics interfaces, video interfaces, user input interfaces, and/or peripheral interfaces. In various embodiments, I/O subsystem 18 may be used to support various peripheral devices 142, such as camera 142-1, display 142-2, microphone 142-3 and speaker 142-4 as well as other peripheral devices 142 such as a keyboard, an accelerometer, a touch pad, a gyroscope, an IR sensor, a sensor, or another type of peripheral device.

Local storage resource 20 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 22 may be a suitable system, apparatus, or device operable to serve as an interface between information handling system 100 and a network 121. Network interface 22 may enable information handling system 100 to communicate over network 121 using a suitable transmission protocol and/or standard, including, but not limited to, transmission protocols and/or standards enumerated below with respect to the discussion of network 121. In some embodiments, network interface 22 may be communicatively coupled via network 121 to a server 120. Network 121 may be a public network or a private (e.g. corporate) network. The network 121 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 22 may enable wired and/or wireless communications (e.g., NFC or Bluetooth) to and/or from information handling system 100.

Network 121 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Users of information handling systems 100 may communicate with other users of information handling systems 100 to share ideas and collaborate on projects. One or more persons may be in a field of view of the information handling system 100, wherein a field of view may refer to a distance in any direction that information presented by information handling system 100 may be seen or heard by a person.

A field of view may be based on a distance that information presented on a display by information handling system may be seen by a person. The field of view may be based on font size or other parameters of the information or may be based on the size of the screen displaying the information.

A field of view may be based on a distance that information output to a speaker by information handling system may be heard by a person. The field of view may be based on a volume level of a speaker or the number of speakers broadcasting the information.

Persons in Field of View Pose Security Risks

With the proliferation of mobile information handling systems 100 and users transporting and interacting with secure data, companies must address the security of their information security systems to protect data in their information systems. Shoulder surfing is common and becoming a more regular attack vector for data loss. Shoulder surfing may include scenarios in which one or more users are working on a sensitive document in a trusted environment and a person walks up behind the user and tries to see data. Shoulder surfing may also include scenarios in which one or more users are participating in an audio presentation and a person walks up behind the user and listens to the audio presentation. These cases represent security risks that would benefit from secure operations and indications without requiring the user to constantly monitor the surroundings or requiring OS level software.

Hardware such as privacy screens, electromechanical shutters and hardware-managed audio mute provide some protection. Some information handling systems 100 may be configured with an operating system that restricts inter-process communication between hardware and service layers.

Embodiments may be directed to an intelligent sensor hub (ISH)—based service that uses sensors to detect the presence of people in a field of view of information handling system 100 and adjusts privacy settings of the information handling system 100 to protect data. A virtual driver consolidates information from the sensors to determine a change in the number of people in the field of view and provides direct out-of-band communication to an embedded controller (EC) configured to modify system privacy status. The EC analyzes the information and may change the privacy mode of information handling system 100 based on a privacy policy and the detected privacy state.

Managing Multi-User State Changes

FIG. 2 illustrates a sequence diagram 200 for dynamically managing multi-user state changes using a firmware isolated path for an information handling system 100 according to one or more privacy policies.

At step 202, embedded controller (EC) 180 retrieves a privacy policy from memory. In some embodiments, a privacy policy may be stored in non-volatile memory 16. In some embodiments, a privacy policy may be retrieved from a network storage location and may be retrieved using in-band communications. An information technology decision maker (ITDM) may establish privacy policies or modes related to the use of IHS 100. A privacy policy may limit (including preventing) the use of an input device 142 or an output device 142 based on the presence of multiple persons in a field of view of information handling system. A privacy policy may prevent or limit any input devices 142 from capturing information or prevent or limit any output devices 142 from presenting information when too many persons are nearby. A privacy policy may control access to an I/O device such as camera 142-1, display 142-2, microphone 142-3 and speaker 142-4. A privacy policy may be implemented based on information handling system 100 operating in a portrait orientation or a landscape orientation or configured as a tablet or a laptop. In some embodiments, EC 180 may retrieve a default privacy policy that limits the display of video information or the playing of audio information to a single user.

At step 204, EC 180 sets a configuration of information handling system 100. EC 180 may set a default privacy configuration that allows a user to access one or more of camera 142-1, display 142-2, microphone 142-3 and speaker 142-4. In other embodiments, EC 180 configures I/O subsystem 140 to disable the functions of selected I/O devices 142.

At step 206, intelligent sensor hub 170 loads software or begins executing instructions to monitor sensors 172 to detect users in the field of view of information handling system 100. In some embodiments, step 206 is performed when information handling system 100 is powered on. In other embodiments, step 206 may be performed when an application is initiated or based on a location of information handling system 100.

At step 208, intelligent sensor hub 170 detects the number of people in the field of view of information handling system 100. In some embodiments, intelligent sensor hub 170 includes sensors to detect movement or faces of persons. In some embodiments, intelligent sensor hub 170 includes sensors to detect ambient conditions such as light or noise.

At step 210, intelligent sensor hub 170 determines if there has been a change in the number of people in the field of view of information handling system 100. In some embodiments, intelligent sensor hub 170 detects a change in movement, a change in the number of detected faces, a change in ambient light or a change in ambient noise to determine there has been a change in the number of people in the field of view of information handling system 100.

If there has been no change, intelligent sensor hub 170 continues monitoring the field of view of information handling system 100.

At step 212, if there has been a change in the number of people in the field of view of information handling system 100, intelligent sensor hub 170 communicates with EC 180 to provide information about the number of people in the field of view of information handling system 100.

At step 214, EC 180 receives data from intelligent sensor hub 170.

At step 216, EC 180 determines whether to change the privacy policy under which information handling system 100 should operate. In some embodiments, EC 180 may receive information from other components or subsystems in information handling system 100 to determine whether to change the privacy policy under which information handling system 100 should operate. For example, EC 180 may communicate with host 302 to determine if a file accessed by information handling system 100 includes sensitive information that should be protected. EC 180 may get location information for information handling system 100 to determine if information handling system 100 is in a secure area in which any number of persons can be in the field of view. EC 180 may communicate in-band or side-band to get additional information.

At step 218, if EC 180 determines no change in the policy is needed, EC 180 continues to monitor communications from intelligent sensor hub 170. For example, EC 180 may determine there has been an increase in the number of persons in the field of view but determine that information handling system 100 is already operating under a privacy policy that allows multiple persons.

At step 220, if EC 180 determines to change the privacy policy, EC 180 retrieves the new privacy policy from memory 16 and sets a new privacy configuration for information handling system 100. In some situations, the new privacy policy may cause information handling system 100 to initiate video privacy functions to block visibility of information. In some situations, the new privacy policy may cause information handling system 100 to initiate a privacy screen to block visibility of information. For example, information handling system 100 may activate electromechanical shutters to decrease the field of view of a display. In some situations, the new privacy policy may cause information handling system 100 to initiate audio privacy controls to reduce the volume of audio output. For example, information handling system 100 may reduce the volume of speakers 142-4.

Steps 202-220 may be performed when information handling system 100 is powered up and continue until information handling system is powered down.

FIG. 3 depicts a system architecture diagram for controlling a multi-user state change. In some embodiments, a processor that performs multi-user detection is configured to send out-of-band communications to the embedded controller independently of any in-band communications that involve the operating system. Out-of-band communications may include direct communication or other transport protocols that do not require or affect the operating system. In some embodiments, out-of-band communications may occur over a physically separate network connector. Out-of-band communication allows embodiments to monitor a field of view, detect a number of persons in the field of view, determine if the number of persons in the field of view has changed, determine if a new privacy policy should be implemented and configure information handling system 100 based on a new privacy policy independently of an operating system executing on information handling system 100.

Information handling system 100 may include host operating system 302 comprising optimizer instructions 304, biometric presence instructions 308, sensor stack 310 and ISH kernel mode drivers 312. Information handling system 100 may contain intelligent sensor hub 170 as firmware separate from host 302, wherein intelligent sensor hub 170 contains sensors 172 with associated drivers 174 and blocks of instructions 176 for determining the number of persons in a field of view of information handling system 100.

Optimizer instructions 304 may be executable to dynamically optimize system performance using artificial intelligence (AI) and machine learning (ML).

Biometric presence instructions 308 may include instructions executable to determine if a user is positioned in front of information handling system 100.

Sensor stack 310 comprises a data structure for storing objects related to sensors 172.

ISH kernel mode drivers 312 may receive information from applications and pass the information to biometric presence instructions 314 in ISH 170.

Intelligent sensor hub 170 comprises multi-user state change instructions 180 executable to receive signals from sensors 172 over peripheral bus driver 171 and communicate with EC 180. Intelligent sensor hub 170 consolidates information from sensors 172 to determine a change in the number of people in the field of view and provides direct out-of-band communication to an embedded controller (EC) configured to modify system privacy status. Intelligent sensor hub 170 may also send information including settings, a confidence level, timer information to EC 180.

Human detection instructions 176-1 may be executable to communicate with Time of Flight (ToF) driver 174-1 coupled to ToF sensor 172-1 to detect a human presence relative to a field of view of information handling system 100. ToF sensor 172-1 may detect movement to determine a person is present.

Ambient light detection instructions 176-2 may be executable to communicate with ambient light sensor (ALS) driver coupled to ambient light sensor (ALS) 172-2 to detect ambient light relative to information handling system 100.

Face detection instructions 176-3 may be executable to communicate with face detection driver 174-3 coupled to face detection sensor 172-3 to identify multiple persons relative to information handling system 100.

Single device orientation (SDO) instructions 176-4 may be executable to communicate with SDO driver 174-4 coupled to SDO sensor 172-4 to determine an orientation of information handling system 100. In some embodiments, SDO sensor 172-4 may be an accelerometer. A privacy policy may be associated with information handling system 100 operating in portrait mode, such as in a tablet configuration. A privacy policy may be associated with information handling system 100 operating in landscape mode, such as in a laptop configuration.

Hinge instructions 176-5 may be executable to communicate with hinge driver 174-5 coupled to a hinge sensor 172-5 to determine if information handling system 100 is open or closed. A hinge may be closed such that information handling system 100 is in a clamshell mode. In some embodiments, hinge sensor 172-5 may be an accelerometer. A privacy policy may be associated with information handling system 100 operating in an open configuration as in a tablet configuration with hinge at approximately 360 degrees. A privacy policy may be associated with information handling system 100 operating in an open configuration with hinge at approximately 135 degrees.

Multi-state user change instructions 178 may receive information from one or more sensors 172 to determine the number of persons in a field of view of information handling system 100. Multi-state user change instructions 178 may determine if there has been a change in the number of persons in a field of view of information handling system 100. Multi-state user change instructions 178 may communicate information to privacy manager service 182 executing on EC 180.

Embedded controller (EC) 180 may contain privacy manager service 182 comprising instructions for receiving information from multi-state user change instructions 178 and determining if the change in the number of persons requires a change in the configuration of information handling system 100.

Video privacy instructions 182-1 comprises instructions for configuring settings of information handling system 100 for video privacy. Video privacy may include limiting how much information can be displayed, the size of font, how long a video presentation can last or other parameters such that a person outside of a field of view is unable to see the information.

Privacy screen instructions 182-2 comprises instructions for configuring settings of information handling system 100 according to a privacy policy that requires a privacy screen. Privacy screen instructions 182-2 may initiate use of electromechanical shutters to limit the field of view of information handling system 100.

Audio privacy instructions 182-3 comprises instructions for configuring settings of information handling system 100 for audio privacy. Audio privacy may include limiting a volume of speakers 142-4 or how long an audio presentation can last.

When information handling system 100 is powered down, EC 180 may reconfigure information handling system 100 to a default privacy policy.

Using embodiments disclosed herein, users may collaborate with other users without the need to constantly monitor the surroundings to protect data from other persons moving into the field of view. Furthermore, IHS 170 and EC 180 communicate out-of-band such that the operating system of information handling system 100 is not affected and therefore available for other processing.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for dynamically managing privacy mode settings in an information handling system executing an application, comprising:
    an embedded controller (EC) for activating a set of electromechanical shutters to configure a field of view of the information handling system according to a first privacy policy;
    an intelligent sensor hub coupled to a set of sensors comprising a face detection sensor and a Time of Flight (ToF) sensor, the intelligent sensor hub configured to:
    receive information from the set of sensors;
    determine a number of persons in the field of view of the information handling system;
    determine a change in the number of persons in the field of view; and
    communicate the change in the number of persons to the EC, wherein the communication is performed out-of-band,
    wherein the EC comprises a privacy manager service configured to:
    receive the communication from the intelligent sensor hub;
    determine a second privacy policy based on the change in the number of persons in the field of view; and
    activate the set of electromechanical shutters to decrease the field of view of the information handling system based on the second privacy policy.

2. The system of claim 1, wherein:
    the set of sensors comprises a hinge sensor;
    the intelligent sensor hub is configured to:

determine the number of persons in the field of view based on the information received from the face detection sensor and the ToF sensor; and determine the information handling system is in an open configuration based on information received from the hinge sensor; and the second privacy policy causes the EC to activate the set of electromechanical shutters to decrease the field of view of the information handling system based on the number of persons in the field of view and the open configuration of the information handling system.

3. The system of claim 1, wherein:

the set of sensors comprises an ambient light sensor;

the intelligent sensor hub is configured to determine the number of persons in the field of view based on the information received from the face detection sensor, the ToF sensor and the ambient light sensor; and the second privacy policy causes the EC to activate the set of electromechanical shutters to decrease the field of view of the information handling system based on the number of persons in the field of view and the ambient light conditions.

4. The system of claim 1, wherein:

the set of sensors comprises a single device orientation (SDO) sensor, and the intelligent sensor hub is configured to determine the number of persons in the field of view based on the information received from the face detection sensor, the ToF sensor and the SDO sensor; and the second privacy policy causes the EC to activate the set of electromechanical shutters to decrease the field of view of the information handling system based on the number of persons in the field of view and an orientation of the information handling system.

5. The system of claim 1, wherein:

the set of sensors comprises an ambient noise sensor, and the intelligent sensor hub is configured to determine the number of persons in the field of view based on the information received from the face detection sensor, the ToF sensor and the ambient noise sensor; and the second privacy policy causes the EC to activate the set of electromechanical shutters to decrease the field of view of the information handling system based on the number of persons in the field of view and the ambient noise.

6. The system of claim 1, wherein:

the privacy manager service is coupled to one or more of:

a visual privacy block of instructions executable to configure the information handling system to limit the display of visual information on a display;

a privacy screen block of instructions executable to activate the set of electromechanical shutters to limit the field of view; and an audio privacy block of instructions executable to configure the information handling system to limit the output of audio information by a speaker.

7. The system of claim 1, wherein the intelligent service hub communicates with the EC via an out-of-band connection independent of an operating system of the information handling system.

8. A computer-implemented method for dynamically managing privacy mode settings in an information handling system executing an application, comprising:

activating a set of electromechanical shutters to configure a field of view of the information handling system according to a first privacy policy;

receiving information from a set of sensors, by an intelligent sensor hub, the set of sensors comprising a face detection sensor and a Time of Flight (ToF) sensor;

determining a number of persons in the field of view of the information handling system;

determining a change in the number of persons in the field of view; and communicating the change in the number of persons to an embedded controller (EC), wherein the communication is performed out-of-band;

receiving the information from the intelligent sensor hub by a privacy manager service;

determining a second privacy policy based on the change in the number of persons in the field of view; and activating the set of electromechanical shutters to decrease the field of view of the information handling system based on the second privacy policy.

9. The method of claim 8, wherein:

the set of sensors comprises a hinge sensor;

determining the number of persons in the field comprises determining the number of persons in the field of view based on the information received from the face detection sensor, the ToF sensor;

determining the information handling system is in an open configuration based on information received from the hinge sensor; and activating the set of electromechanical shutters to decrease the field of view of the information handling system based on the number of persons in the field of view and the open configuration of the information handling system.

10. The method of claim 8, wherein:

the set of sensors comprises an ambient light sensor;

determining the number of persons in the field of view comprises determining the number of persons in the field of view based on the information received from the face detection sensor, the ToF sensor and the ambient light sensor; and activating the set of electromechanical shutters to decrease the field of view of the information handling system based on the number of persons in the field of view and the ambient light conditions.

11. The method of claim 8, wherein:

the set of sensors comprises a single device orientation (SDO) sensor, and determining the number of persons in the field of view comprises determining the number of persons in the field of view based on the information received from the face detection sensor, the ToF sensor and the SDO sensor; and configuring the information handling system based on the number of persons in the field of view and an orientation of the information handling system.

12. The method of claim 8, wherein:

the set of sensors comprises an ambient noise sensor, and determining the number of persons in the field of view comprises determining the number of persons in the field of view based on the information received from the face detection sensor, the ToF sensor and the ambient noise sensor; and activating the set of electromechanical shutters to decrease the field of view of the information handling system based on the number of persons in the field of view and ambient noise.

13. The method of claim 8, further comprising:

configuring the information handling system to limit the display of visual information on a display;

activating the set of electromechanical shutters to initiate a privacy screen to limit the field of view; and
configuring the information handling system to limit the output of audio information by a speaker.

14. The method of claim 8, wherein the intelligent service hub communicates with the EC via an out-of-band connection independent of an operating system of the information handling system.

15. An information handling system, comprising:
a host operating system;
a set of sensors comprising a face detection sensor and a Time of Flight (ToF) sensor;
an embedded controller (EC) for activating a set of electromechanical shutters to configure a field of view of the information handling system according to a first privacy policy;
an intelligent sensor hub coupled to the set of sensors, the intelligent sensor hub configured to:
receive information from the set of sensors;
determine a number of persons in a field of view of the information handling system;
determine a change in the number of persons in the field of view; and
communicate the change in the number of persons to the EC, wherein the communication is performed via an out-of-band connection independent of the host operating system,
wherein the EC comprises a privacy manager service configured to:
receive the information from the intelligent sensor hub;
determine a second privacy policy based on the change in the number of persons in the field of view; and
activate the set of electromechanical shutters to decrease the field of view of the information handling system based on the second privacy policy.

16. The information handling system of claim 15, wherein:
the set of sensors comprises a hinge sensor;
the intelligent sensor hub is configured to:
determine the number of persons in the field of view based on the information received from the face detection sensor and the ToF sensor; and
determine the information handling system is in an open configuration based on information received from the hinge sensor; and
the second privacy policy causes the EC to activate the set of electromechanical shutters to decrease the field of view of the information handling system based on the number of persons in the field of view and the open configuration of the information handling system.

17. The information handling system of claim 15, wherein:
the set of sensors comprises an ambient light sensor;
the intelligent sensor hub is configured to determine the number of persons in the field of view based on the information received from the face detection sensor, the ToF sensor and the ambient light sensor; and
the second privacy policy causes the EC to activate the set of electromechanical shutters to decrease the field of view of the information handling system based on the number of persons in the field of view and the ambient light conditions.

18. The information handling system of claim 15, wherein:
the set of sensors comprises a single device orientation (SDO) sensor, and
the intelligent sensor hub is configured to determine the number of persons in the field of view based on the information received from the face detection sensor, the ToF sensor and the SDO sensor; and
the second privacy policy causes the EC to activate the set of electromechanical shutters to decrease the field of view of the information handling system based on the number of persons in the field of view and an orientation of the information handling system.

19. The information handling system of claim 15, wherein:
the set of sensors comprises an ambient noise sensor, and
the intelligent sensor hub is configured to determine the number of persons in the field of view based on the information received from the face detection sensor, the ToF sensor and the ambient noise sensor; and
the second privacy policy causes the EC to activate the set of electromechanical shutters to decrease the field of view of the information handling system based on the number of persons in the field of view and the ambient noise.

20. The information handling system of claim 15, wherein:
the privacy manager service is coupled to one or more of:
a visual privacy block of instructions executable to configure the information handling system to limit the display of visual information on a display;
a privacy screen block of instructions executable to activate the set of electromechanical shutters to limit the field of view; and
an audio privacy block of instructions executable to configure the information handling system to limit the output of audio information by a speaker.

* * * * *